United States Patent
Stuyvenberg et al.

[11] Patent Number: 6,109,381
[45] Date of Patent: Aug. 29, 2000

[54] CRASH RESTRAINING VEHICLE CAB SUSPENSION UNIT AND TEST METHOD THEREFOR

[75] Inventors: Douglas G. Stuyvenberg, Savage, Minn.; Suzanne M. Schneider, Franklin, Wis.

[73] Assignee: Applied Power Inc., Waukesha, Wis.

[21] Appl. No.: 09/166,040

[22] Filed: Oct. 5, 1998

[51] Int. Cl.[7] .................................................. B62D 33/10
[52] U.S. Cl. .................................... 180/89.12; 280/124.1; 296/190.07
[58] Field of Search .............................. 180/89.12, 89.13, 180/89.14, 89.19; 280/124.1; 296/190.01, 190.03, 190.07, 35.1, 35.2

[56] References Cited

U.S. PATENT DOCUMENTS

| | | | |
|---|---|---|---|
| 4,294,324 | 10/1981 | Kimball et al. | 180/89.14 |
| 4,989,684 | 2/1991 | Conaway | 180/89.15 |
| 5,109,939 | 5/1992 | Conaway et al. | 180/89.15 |
| 5,209,316 | 5/1993 | Bauer | 180/89.14 |
| 5,253,853 | 10/1993 | Conaway et al. | 267/256 |
| 5,553,911 | 9/1996 | Bodin et al. | 296/190 |

*Primary Examiner*—Paul N. Dickson
*Attorney, Agent, or Firm*—Quarles & Brady LLP

[57] ABSTRACT

A vehicle cab suspension unit has a support plate for fixation to a vehicle frame, an impact plate for fixation to a cab of the vehicle, a pair of air springs supporting the impact plate above the support plate, and a pair of shock absorbers for damping changes in the separation between the impact and support plates. A track arm is pivotally connected between the support and impact plates for permitting changes in the vertical separation of the plates and restraining lateral motion of the plates relative to one another. A U-shaped crash restraint strap is fixed to the support plate and loops over the track arm to restrain the track arm from excessive pivoting in an angular direction away from the support plate, so as to deform the suspension unit to absorb energy in a crash and resist complete separation of the support and impact plates. The unit is tested in a crash test skid by orienting it with its axis, which is normally vertical, directed in the crash test direction of movement of the skid, and with the impact plate being fixed to a test mass, simulating the truck cab, which is moveable relative to the skid.

3 Claims, 4 Drawing Sheets

CRASH RESTRAINING VEHICLE CAB SUSPENSION UNIT AND TEST METHOD THEREFOR

BACKGROUND OF THE INVENTION

1. Field of the Invention

This invention relates to vehicle cab suspension systems of the type which employ springs and shock absorbers to support a vehicle cab, such as a truck cab, on the frame of the vehicle, and in particular to a crash restraint for such a system.

2. Discussion of the Art

Truck cab suspensions which employ springs, typically air springs, and shock absorbers are well known for supporting the rear of truck cabs of the type that are hinged at the front of the cab to the truck frame along a lateral axis. For example, U.S. Pat. Nos. 4,989,684; 5,109,939; 5,209,316; and 5,253,853 disclose such suspension units. These units usually have two spaced plates, with an upper one of the plates fixed to the cab and a lower one of the plates fixed to the frame, with the plates vertically movable relative to one another. The upper plate is supported by the springs and damped by the shock absorbers. In addition to these components, the suspension units usually have an air valve for regulating the height of the unit by regulating the admission or exhaust of air to the air springs, and may have a track arm, as shown in the '853 patent, for controlling the lateral, or side-to side, tracking of the cab relative to the frame, to restrain the cab laterally relative to the frame.

When a truck with a suspension unit as described above has a crash, the frontal impact causes the cab to rotate forwardly about the frontal pivot axis. This causes a much greater separating force on the plates of the suspension unit than is normally encountered in over-the-road usage. The force is so great that the suspension unit can be simply pulled apart, which can result in the cab pivoting frontwards beyond the normal intended limit. Consequently, a need exists for a suspension unit with better restraint of the cab under crash conditions.

SUMMARY OF THE INVENTION

The invention provides a vehicle cab suspension unit having a crash restraint strap fixed to the support plate which loops over the track arm to restrain the track arm from excessive pivoting in an angular direction away from the support plate. The strap serves to deform the suspension unit in a crash to absorb energy, and to resist complete separation of the support and impact plates.

In a preferred form, the strap is inverted U-shaped, with two legs opening toward the support plate, and each leg fixed to the support plate. The strap is preferably angled from the support plate in a direction toward a pivot point of the track arm to the support plate so that the top of the strap is generally parallel to the track arm when the track arm first contacts the top of the strap. This places a generally tensile load on the strap, which reduces the chance it will fail in a crash and assures that most of the deformation of the suspension unit in a crash will be taken up by bending of the track arm in a controlled fashion.

These and other objects and advantages of the invention will be apparent from the detailed description and from the drawings.

DETAILED DESCRIPTION OF THE PREFERRED EMBODIMENT

Figure 1:
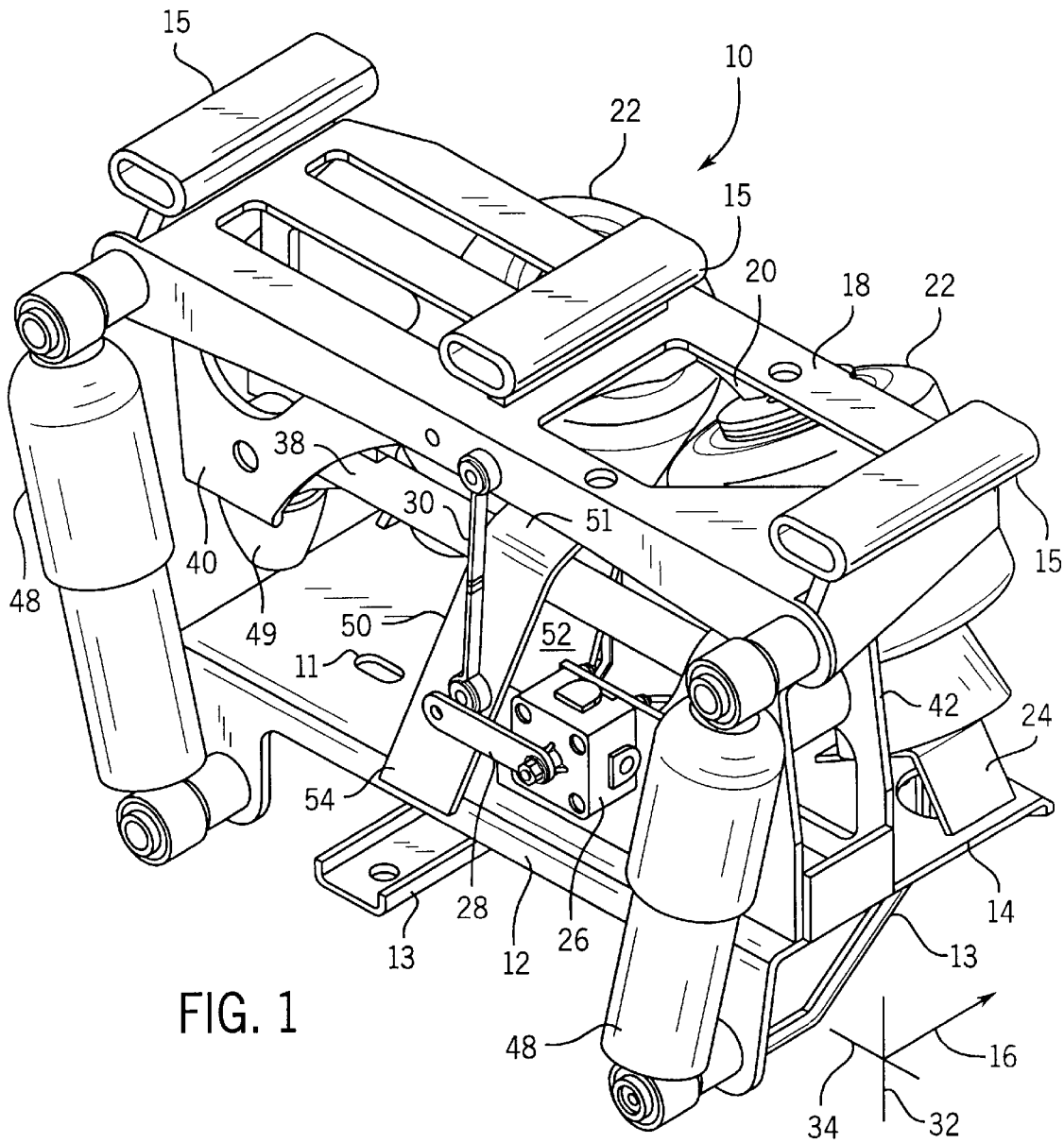
FIG. 1 is a perspective view of a cab suspension unit incorporating the invention.
Figure 2:
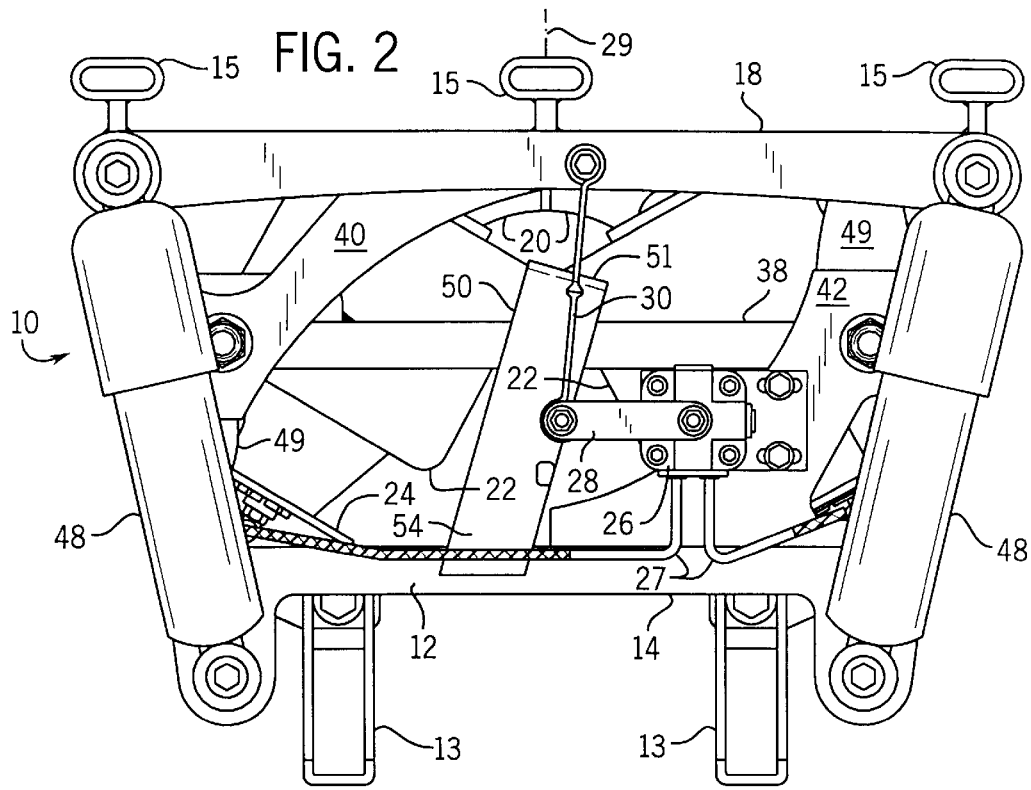
FIG. 2 is a rear plan view of the suspension unit of FIG. 1.
Figure 3:
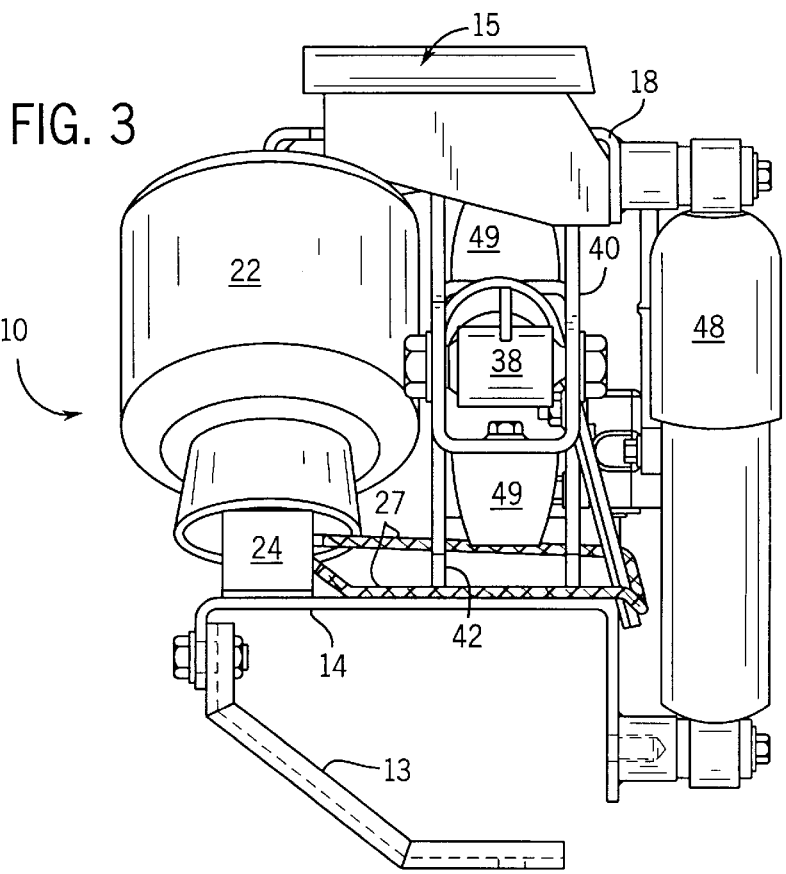
FIG. 3 is a left side elevation view of the suspension unit of FIG. 1.
Figure 4:
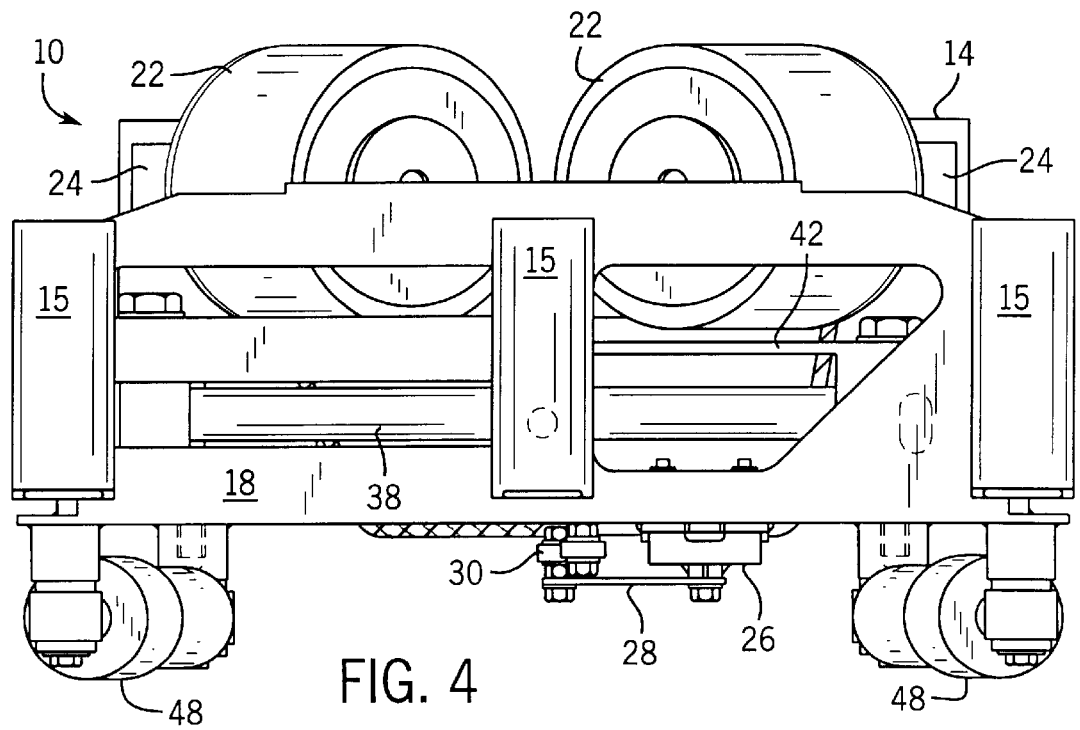
FIG. 4 is a top plan view of the suspension unit of FIG. 1.

FIGS. 1–4 illustrate a truck cab suspension unit 10 of the invention. The unit 10 may be incorporated in a truck to support the rear of the cab of the truck in the manner disclosed in connection with FIG. 1 of U.S. Pat. No. 5,253,853, which is hereby incorporated by reference. The unit 10 is incorporated in a truck with the flange 12 of support plate 14 running laterally (side-to-side) and at the rear of the unit 10. In that orientation, arrow 16 of FIG. 1 points toward the front of the truck, line 32 is generally vertical and line 34 runs laterally. As used herein, right and left are with reference to the right and left of the truck, when standing behind and looking at the rear of the truck (as in the drawing descriptions).

The support plate 14 is bolted to the frame of the truck, and the impact plate 18 is bolted to the cab. Holes 11 and brackets 13 are provided for mounting the support plate 14 to the frame, and tubular mounts 15 are welded to the impact plate 18 through which bolts are inserted for mounting the impact plate 18 to the cab. Air spring mounting brackets 20 (FIG. 2) are welded to the impact plate 18 and at their lower ends are bolted to the tops of respective air springs 22. The air springs 22 are well-known and of any suitable type. The lower ends of the air springs 22 are bolted to air spring mounting brackets 24 which are welded to the support plate 14.

Compressed air from the truck's air compressor is supplied to or exhausted from the air springs 22 by air valve 26. Tubing for supplying the valve 26 from the truck's air system is not shown, but tubing 27 from the valve to the air springs is illustrated for supplying or exhausting the air springs 22. Supplying or depleting air springs with air valves in truck cab suspension units is well-known. As is conventional, the valve 26 is fixed to the support plate 14 and has an arm 28 which is connected (for example with a bolt—not shown in FIG. 1) to linkage 30, which has its upper end connected to the impact plate 18. Movement of the plates 18 and 14 vertically apart (from the steady-state position shown in FIG. 1, with arm 28 generally horizontal) along the major axis 29 (FIG. 2) of the unit causes compressed air to be exhausted from the springs 22, and the plates 18 and 14 moving vertically toward one another along the major axis 29 from the steady state position causes valve 26 to admit compressed air into the springs 22. Thereby, the valve 26 always seeks to maintain the arm 28 in the generally horizontal position illustrated in FIGS. 1 and 2, seeking to provide a constant average height of the plate 18 relative to the plate 14.

Lateral stability and also restraint of longitudinal motion between the plates 18 and 14 is provided by a track arm 38. The left end of track arm 38 is pivotally connected to track arm bracket 40, which is welded to the impact plate 18. The right end of track arm 38 is pivotally connected to track arm bracket 42, which is welded to the support plate 14. The track arm runs substantially from one lateral end of the unit 10 to the other. A pair of automotive type hydraulic shock absorbers 48 have their upper ends pivotally connected to the impact plate 18, and their lower ends pivotally connected to the support plate 14. One or more elastomeric snubbers 49 may also be provided to give a relatively soft landing if the limit of compression of the unit 10 is reached.

At approximately midway between the ends of the track arm 38, a generally u-shaped strap 50 envelopes the track arm. The strap 50 is substantially shorter in lateral dimension than the track arm 38, and is angled so that its upper end 51 is generally parallel to the track arm 38 in the position of the track arm 38 in which it first contacts the upper end 51. This occurs when the support plate 14 and impact plate 18 have exceeded the maximum normal vertical separation, such as may occur in a frontal crash of the vehicle. In normal, non-crash over the road useage, the track arm does not contact the strap 50.

The lower end of both of the front 52 and rear 54 legs of the lower end of the strap 50 are welded to the support plate 14. In making these welds, each leg 52, 54 should be welded both from the outside of the strap 50, and from the inside, so that each leg 52, 54 has a lateral weld bead welding it to the support plate 14 on both the front side and the rear side of the leg.

In a crash, when the support 14 and impact 18 plates exceed their normal separation and the track arm 38 contacts the upper end of the strap 50, further separation of the plates 14 and 18 results in bending of the unit 10. Much of this bending occurs in the track arm 38, but also significant bending occurs in the impact plate 14 and strap 50. The plate 14 tends to bend upwardly in the area where the strap 50 is attached to it, and the top 51 of the strap 50 tends to bend from being straight as viewed in rear elevation (FIG. 2), to being concave up, following the bend in the track arm 38. Such bending is desirable in a crash, since it helps absorb energy and decelerate the upward motion of the cab.

While the springs 22 and shock absorbers 48 may break in a crash, the strap 50 and track arm 38, and their associated attachments, should be made strong enough not to break in a typical crash, to keep the suspension unit plates 14 and 18 from totally separating, and to absorb as much energy as possible by bending. For example, in a preferred form, the strap is 3/16" thick grade 80 steel and the track arm is 1"O.D. steel tube with a 1/4" wall thickness. The track arm ends are pivotally connected to the plate mounting brackets using elastomeric bushing eye rings (a rubber bushing with a metal sleeve in it, as is common in the end of an automotive shock absorber) of 1.75"O.D. and 1.25"I.D., using 16 mm bolts to attach the ends of the track arm to the respective plates 14 and 18.

For making a suspension unit of the invention suitable for a particular application, or to determine the characteristics of any truck cab suspension unit under crash conditions, it is desirable to test the unit. It is usually not economically possible to test truck cab suspension units in an actual crash of a truck, however, since that would demolish the truck and be prohibitively expensive for many designs. Therefore, it is desirable to test the unit in simulated truck crash conditions.

Figure 5:
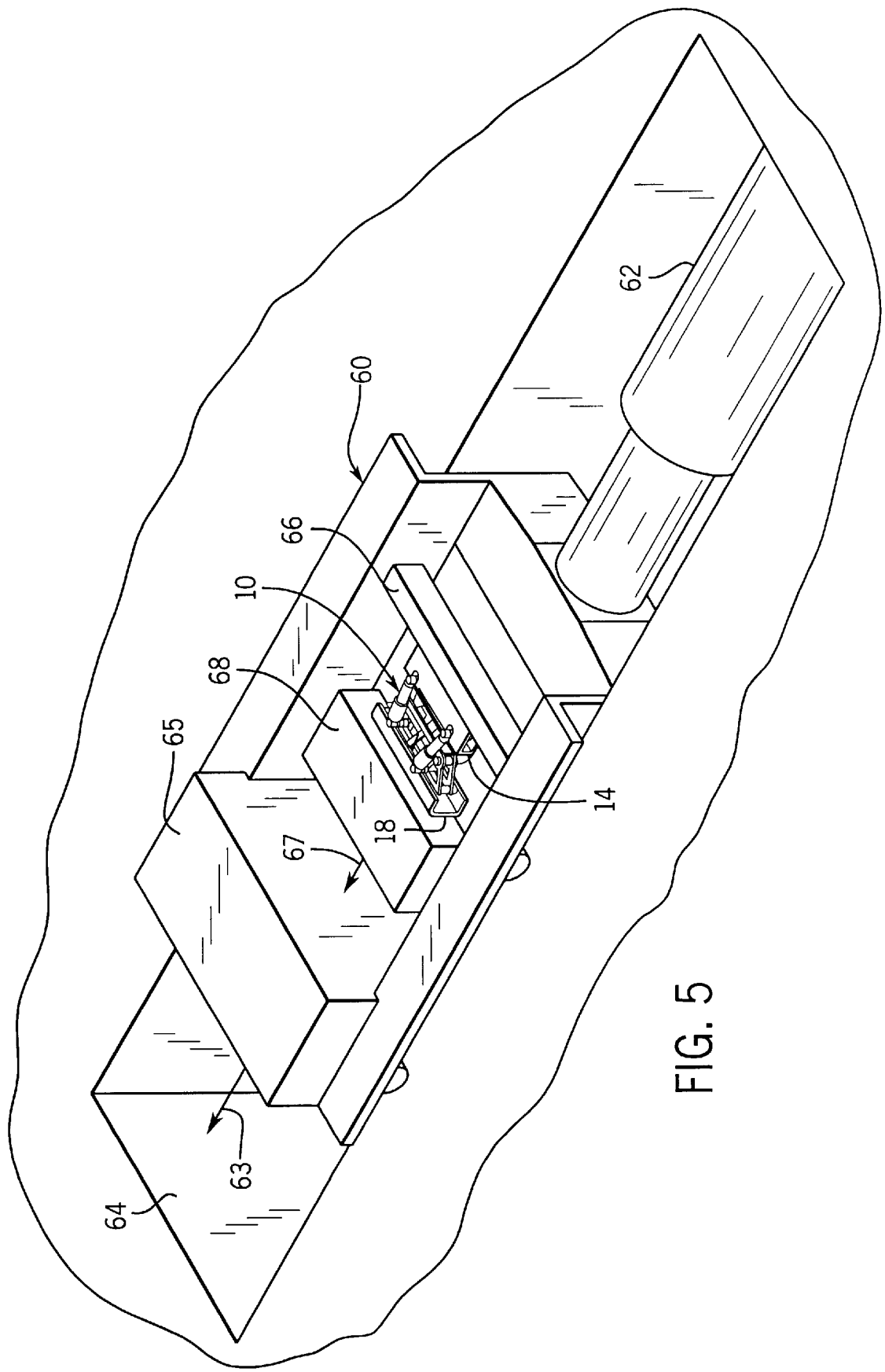
FIG. 5 is a perspective view of a crash test set-up for a truck cab suspension unit.

Such a simulated truck crash test apparatus is illustrated in FIG. 5. The suspension unit, illustrated as the unit 10, is mounted on a general purpose crash test skid 60 with its major axis 29 oriented in the crash test direction 63. The skid 60 is accelerated by a cylinder 62 in the crash test direction 63 and is abruptly decelerated when it hits wall 64. The suspension unit 10 is mounted with the support plate 14 fixed to fixed beam 66, which is fixed relative to the skid 60, and with the impact plate 18 mounted to test mass 68, which is slidable in the crash test direction relative to the beam 66. Weight 65, which is fixed to the skid 60, is chosen so that the entire weight of the skid 60 simulates that of the truck tractor. The weight of the test mass 68 is chosen to simulate the weight of the cab to which the unit 10 is to be applied. Test mass 68 may be mounted on rails, to restrain its movement to the crash test direction, but preferably is free, being restrained only by the unit 10.

The skid 60 is accelerated by the cylinder 62 to the test speed, e.g., 15 m.p.h., and the skid 60 is crashed into the wall 64. Test mass 68, being slidable relative to the beam 66, has inertia which tends to propel it in the crash test direction, represented by arrow 67, thereby separating the support and impact plates of the unit 10. Thus, the inertia of the test mass 68 is dissipated by the unit 10, which has its support plate 14 fixed to the skid 60. Thereby, the unit 10 is subjected to a simulated crash.

Figure 6:
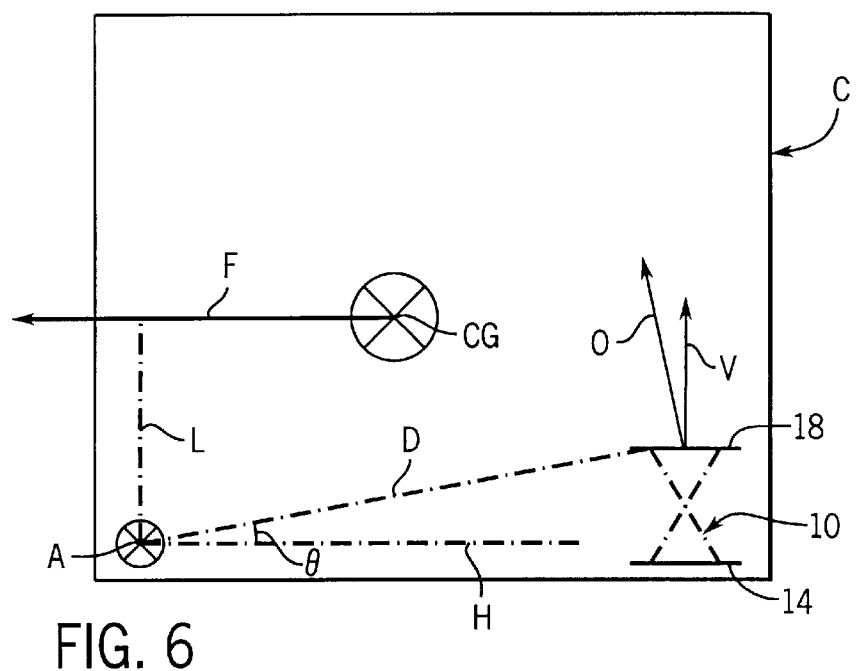
FIG. 6 is a schematic view of forces on a vehicle cab in a crash.

In one form of test, the weight of the test mass 68 is made equal to the weight of the cab. Alternatively, a calculation can be made of the tensile forces on the unit 10 in a crash, considering that the primary deceleration force is in the forward direction of movement of the truck, and that this deceleration force is converted to a tensile load on the unit 10 by the cab pivoting forward. Referring to FIG. 6, the primary deceleration force is calculated using the equation F=MA (Force=Mass of Cab×Deceleration of Cab in direction of travel), with the resulting force F acting through the center of gravity CG of the cab. The moment P about the pivot axis A exerted on the cab C is then calculated, which is equal to FL, where L is the perpendicular distance from the force F to the pivot axis A. The overall force O acting on the cab at approximately the axis 29 of the unit 10 is then given by the equation O=P/D, where D is the distance from the axis 29 of the unit 10 to the pivot axis A. The vertical component V of the force O, which is coaxial with the axis 29 and is the component reacted against by the unit 10, is then given by the equation, V=O cos O, where O is the angle between horizontal H and line D which runs from the cab pivot axis A to the center of the impact plate 18. Thus, force F results in tensile force V on the unit 10. The weight W of the test mass 68 is then chosen to simulate force V, from the equation W=V/A.

Thus, a means of simulating a crash test for a cab suspension unit in which the unit is tested in a general purpose crash test skid is also disclosed, with the support and impact plates perpendicular to the crash test direction, the support plate fixed to the skid, and the impact plate fixed to a test mass, which simulates the mass of the cab and is movable relative to the skid in the crash test direction. When the skid is abruptly decelerated, the test mass, being attached through the suspension unit to the skid, tends to pull the impact plate away from the support plate, thereby simulating crash conditions.

A preferred embodiment of the invention has been described in considerable detail. Many modifications and variations to the preferred embodiment described will be apparent to those skilled in the art. Therefore, the invention should not be limited to the embodiment described.

We claim:

1. In a vehicle cab suspension unit having a support plate for fixation to a vehicle frame, an impact plate separated from said support plate for fixation to a cab of the vehicle, one or more springs supporting the impact plate above the support plate, one or more shock absorbers for damping changes in the separation between the impact and support plates, and a track arm pivotally connected between said support and impact plates for permitting changes in the separation of said plates and restraining lateral motion of said plates relative to one another, the improvement wherein said suspension unit further comprises a crash restraint which includes a strap which loops over said track arm and is fixed to said support plate to restrain said track arm from excessive pivoting in an angular direction away from said support plate.

2. The improvement of claim 1, wherein said strap is inverted U-shaped, with two legs opening toward said support plate, and each said leg is fixed to said support plate.

3. The improvement of claim 1, wherein said strap is angled from said support plate in a direction toward a pivot point of said track arm to said support plate so that a top of said strap is generally parallel to said track arm when said track arm first contacts said top of said strap.

* * * * *